US010391476B2

(12) United States Patent
Yeh et al.

(10) Patent No.: US 10,391,476 B2
(45) Date of Patent: Aug. 27, 2019

(54) INORGANIC NANOFIBER AND METHOD FOR MANUFACTURING THE SAME

(71) Applicant: TAMKANG UNIVERSITY, New Taipei (TW)

(72) Inventors: Ping-Hung Yeh, Taipei (TW); Chun-Yen Lai, Chiayi County (TW); Yu-Ting Lin, Taichung (TW); Pin-Chun Pan, Taipei (TW)

(73) Assignee: TAMKANG UNIVERSITY, New Taipei (TW)

( * ) Notice: Subject to any disclaimer, the term of this patent is extended or adjusted under 35 U.S.C. 154(b) by 0 days.

(21) Appl. No.: 15/406,962

(22) Filed: Jan. 16, 2017

(65) Prior Publication Data
US 2017/0348673 A1    Dec. 7, 2017

(30) Foreign Application Priority Data
Jun. 1, 2016    (TW) .............................. 105117138 A

(51) Int. Cl.
| | | |
|---|---|---|
| *B01J 21/14* | (2006.01) | |
| *B01J 23/14* | (2006.01) | |
| *B01J 21/06* | (2006.01) | |
| *B01J 35/00* | (2006.01) | |
| *B01J 35/06* | (2006.01) | |
(Continued)

(52) U.S. Cl.
CPC ............. *B01J 23/14* (2013.01); *B01J 21/063* (2013.01); *B01J 35/004* (2013.01); *B01J 35/0013* (2013.01); *B01J 35/023* (2013.01); *B01J 35/06* (2013.01); *B01J 37/04* (2013.01); *B01J 37/086* (2013.01); *B01J 37/088* (2013.01); *B01J 37/342* (2013.01)

(58) Field of Classification Search
CPC ...... B01J 23/14; B01J 21/063; B01J 35/0013; B01J 35/004; B01J 35/06; B01J 37/04; B01J 37/086; B01J 37/342
See application file for complete search history.

(56) References Cited

U.S. PATENT DOCUMENTS

2014/0296056 A1 * 10/2014 Nien ...................... B01J 23/60
502/5

FOREIGN PATENT DOCUMENTS

| CN | 1042333488 A | * | 12/2014 | ............. D01D 13/00 |
|---|---|---|---|---|
| CN | 104746179 A | * | 7/2015 | |

OTHER PUBLICATIONS

Jo et. al., Nanofibril formation of electrospun TiO2 fibers and its application to dye-sensitized solar cells, 2005, Journal of Macromolecular Science, 42, 1529-1540.*
(Continued)

*Primary Examiner* — James A Fiorito
(74) *Attorney, Agent, or Firm* — WPAT, PC

(57) ABSTRACT

An organic nanofiber includes a fiber body containing multiple inorganic oxide particles selected from polycrystalline titanium dioxide particles and polycrystalline tin(IV) oxide particles, and having a particle size ranging from 15 to 75 nm. A method for manufacturing the inorganic nanofibers, including: mixing a metal precursor, an organic polymer and a solvent to obtain a solution, the metal precursor being a titanium-containing precursor or a tin-containing precursor; electrospinning the solution at a relative humidity ranging from 50 to 60% to form multiple nanofibers; and annealing the nanofibers at a temperature ranging from 600 to 800° C. to obtain multiple inorganic nanofibers.

6 Claims, 4 Drawing Sheets

(51) Int. Cl.
     *B01J 37/04*                  (2006.01)
     *B01J 37/08*                  (2006.01)
     *B01J 37/34*                  (2006.01)
     *B01J 35/02*                  (2006.01)

(56) References Cited

OTHER PUBLICATIONS

Ding et. al., Titanium dioxide nanofibers prepared by using electrospinning method, 2004, Fibers and Polymers, 2, 105-109.*
Nirmala et. al., Photocatalytic activities of electrospun tin oxide doped titanium dioxide nanofibers, 2012, Ceramics International, 38, 4533-4540.*
CN 104233488A Abstract.*
Machine translation of CN104746179A.*

* cited by examiner

INORGANIC NANOFIBER AND METHOD FOR MANUFACTURING THE SAME

CROSS-REFERENCE TO RELATED APPLICATION

This application claims priority of Taiwanese Invention Patent Application No. 105117138, filed on Jun. 1, 2016.

FIELD

The disclosure relates to an inorganic nanofiber and a method for manufacturing the same, and more particularly to an inorganic nanofiber that is responsive to visible and infrared lights and a method for manufacturing the inorganic nanofiber.

BACKGROUND

Conventional photocatalyst antibacterial products are capable of being activated by ultraviolet (UV) light to generate hydroxyl radicals and superoxide anion radicals from water and oxygen, respectively, so as to inhibit reproduction of microorganisms, such as fungi, bacteria, virus, etc.

A photocatalyst may be applied to a substrate of the photocatalyst antibacterial products with an adhesive, such as an organic adhesive. However, the adhesive may be decomposed by the photocatalyst, and it is not easy to obtain a commercial adhesive suitable for use together with the photocatalyst. Another way to apply the photocatalyst to the conventional photocatalyst antibacterial products is by spraying. However, spraying may adversely affect gas permeability of the fabrics. Lowered gas permeability is typically undesirable for the photocatalyst antibacterial products, such as filters, respirators, functional cloths, etc.

Indoor application of the conventional antibacterial photocatalyst products is limited due to insufficient ultraviolet (UV) light irradiation and requires additional UV light sources disposed indoors. However, excessive exposure to the UV light may result in aging, abnormal propagation and death of human skin cells, or even lead to cancer. Other materials having visible-light activity have been added to the conventional photocatalyst antibacterial products. However, the addition of these materials increases overall costs. In addition, uneven mixing of these materials may occur and adversely affect utilization of the conventional photocatalyst antibacterial products Other materials having visible-light activity have been added to the conventional photocatalyst antibacterial products. However, the addition of these materials increases overall costs. In addition, uneven mixing of these materials may occur and adversely affect utilization of the conventional photocatalyst antibacterial products.

SUMMARY

Therefore, an object of the present disclosure is to provide an inorganic nanofiber and a method for manufacturing inorganic nanofibers that can alleviate at least one of the drawbacks associated with the prior art.

According to one aspect of the present disclosure, an inorganic nanofiber includes a fiber body containing a plurality of inorganic oxide particles, which are selected from the group consisting of polycrystalline titanium dioxide particles and polycrystalline tin(IV) oxide particles, and have a particle size ranging from 15 nm to 75 nm.

According to another aspect of the present disclosure, a method for manufacturing inorganic nanofibers includes:

mixing a metal precursor, an organic polymer and a solvent to obtain an electrospinnable solution, the metal precursor being one of a titanium-containing precursor and a tin-containing precursor;

electrospinning the electrospinnable solution at a relative humidity ranging from 50% to 60% to form a plurality of nanofibers; and annealing the nanofibers at a temperature ranging from 600° C. to 800° C. to obtain a plurality of inorganic nanofibers.

BRIEF DESCRIPTION OF THE DRAWINGS

Other features and advantages of the present disclosure will become apparent in the following detailed description of the examples and embodiments with reference to the accompanying drawings, of which.

DETAILED DESCRIPTION

Figure 1:
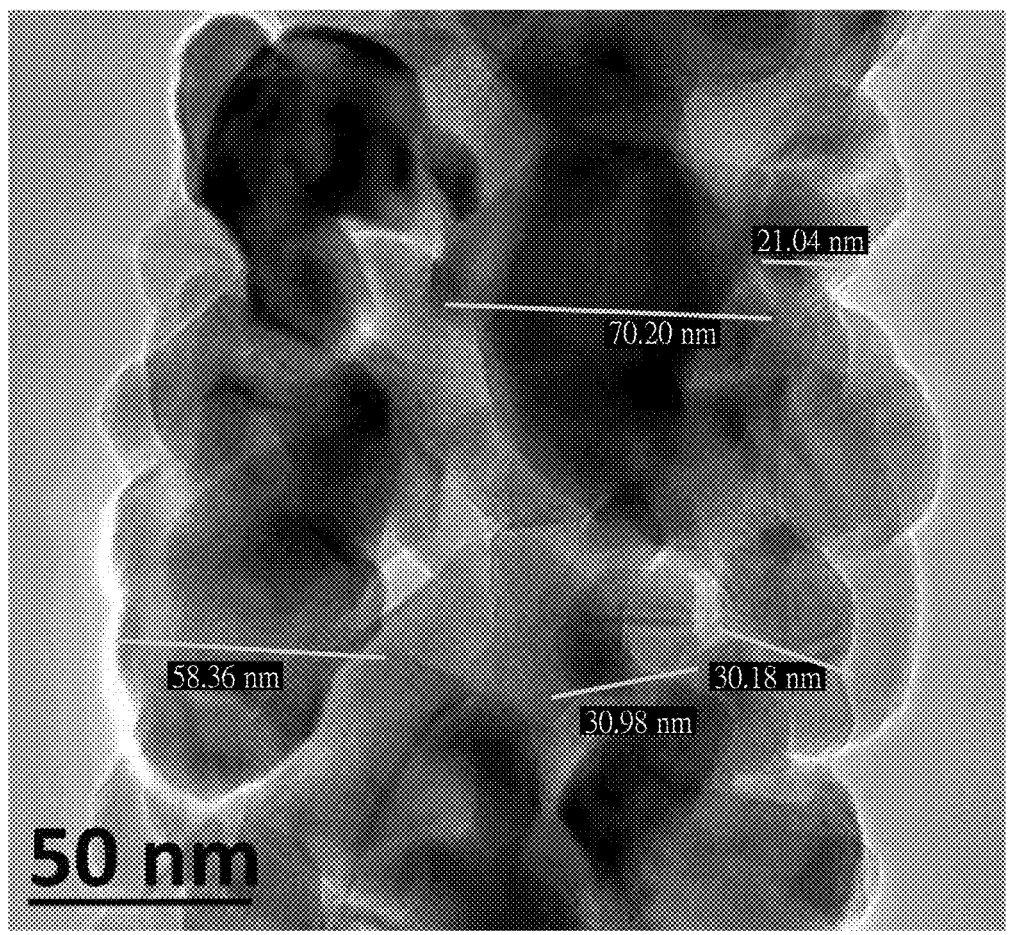
FIG. 1 is a transmission electron microscope image of an inorganic nanofiber made by Example 1 of this disclosure.

According to the present disclosure, an inorganic nanofiber includes a fiber body that contains a plurality of inorganic oxide particles, which are selected from the group consisting of polycrystalline titanium dioxide particles and polycrystalline tin(IV) oxide particles, and have a particle size ranging from 15 nm to 75 nm. The present disclosure also provides a method for manufacturing the inorganic nanofibers. The method includes: mixing a metal precursor, an organic polymer and a solvent to obtain an electrospinnable solution, the metal precursor being one of a titanium-containing precursor and a tin-containing precursor; electrospinning the electrospinnable solution at a relative humidity ranging from 50% to 60% to form a plurality of nanofibers; and annealing the nanofibers in air at a temperature ranging from 600° C. to 800° C. to obtain the inorganic nanofibers.

In certain embodiments, the fiber body has a cross-sectional dimension ranging from 100 nm to 400 nm.

In certain embodiments, the inorganic oxide particles are the polycrystalline titanium dioxide particles, and have a cross-sectional dimension ranging from 20 nm to 75 nm.

In certain embodiments, the inorganic oxide particles are the polycrystalline tin(IV) oxide particles, and have a cross-sectional dimension ranging from 15 nm to 25 nm.

In certain embodiments, the step of electrospinning is conducted at a voltage ranging from 18 kV to 20 kV.

In certain embodiments, during the step of electrospinning, a tip-to-collector distance ranges from 13 cm to 15 cm.

In certain embodiments, prior to electrospinning, the electrospinnable solution is heated to a temperature ranging from 70° C. to 80° C. for 1 hour to 3 hours, followed by cooling the electrospinnable solution to room temperature for electrospinning.

In certain embodiments, the metal precursor is the titanium-containing precursor, the annealing temperature ranges from 700° C. to 800° C., and the inorganic nanofibers include polycrystalline titanium dioxide particles. In certain embodiments, the titanium-containing precursor is titanium (IV) isopropoxide.

In certain embodiments, the metal precursor is the tin-containing precursor, the annealing temperature ranges from 600° C. to 700° C., and the inorganic nanofibers include polycrystalline tin(IV) oxide particles. In certain embodiments, the tin-containing precursor is tin(IV) chloride.

In certain embodiments, the organic polymer is one of polyvinylpyrrolidone (PVP) and polyvinyl alcohol (PVA).

In certain embodiments, the solvent is selected from a group consisting of ethanol, acetic acid, water and combinations thereof.

The following examples and comparative examples are provided to illustrate the embodiments of the disclosure, and should not be construed as limiting the scope of the disclosure.

Example 1: Preparation of Inorganic Nanofibers (E1) Including Polycrystalline Titanium Dioxide Particles Polyvinylpyrrolidone (PVP) is added into ethanol to obtain a polymer solution containing 9 wt % of polyvinylpyrrolidone (PVP). The polymer solution is then mixed with acetic acid in a volume ratio of 7:2, followed by adding titanium(IV) isopropoxide to obtain a titanium-containing electrospinnable solution having a molar concentration of 0.23 M.

The electrospinnable solution is heated in a water bath at 75° C. for 1 hour while simultaneously stirring the electrospinnable solution with a magnetic stirrer, followed by cooling the electrospinnable solution to room temperature. Afterwards, the electrospinnable solution is electrospun at a relative humidity of 55%, a voltage of 20 kV, and a tip-to-collector distance of 13 cm, to obtain a plurality of nanofibers, followed by annealing the nanofibers at 800° C. for 2 hours to obtain a plurality of inorganic nanofibers (E1) including polycrystalline titanium dioxide particles.

A transmission electron microscope (TEM) image of the inorganic nanofibers (E1) is shown in FIG. 1, in which the nanofibers have a diameter ranging from 100 nm to 250 nm, and the polycrystalline titanium dioxide particles have a particle size ranging from 20 nm to 75 nm.

Example 2: Preparation of Inorganic Nanofibers (E2) Including Polycrystalline Tin(IV) Oxide Particles Polyvinyl alcohol (PVA) is added into water to obtain a polymer solution containing 15 wt % of polyvinyl alcohol (PVA). The polymer solution is then mixed with ethanol in a volume ratio of 4:3, followed by adding tin(IV) chloride to obtain a tin-containing electrospinnable solution having a molar concentration of 0.2 M.

The electrospinnable solution is heated in a water bath at 80° C. for 1 hour while simultaneously stirring the electrospinnable solution with a magnetic stirrer, followed by cooling the electrospinnable solution to room temperature. Afterwards, the electrospinnable solution is electrospun at a relative humidity of 55%, a voltage of 18 kV, and a tip-to-collector distance of 13.5 cm, to obtain a plurality of nanofibers, followed by annealing the nanofibers at 600° C. for 3 hours to obtain a plurality of inorganic nanofibers (E2) including polycrystalline tin(IV) oxide particles.

Figure 2:
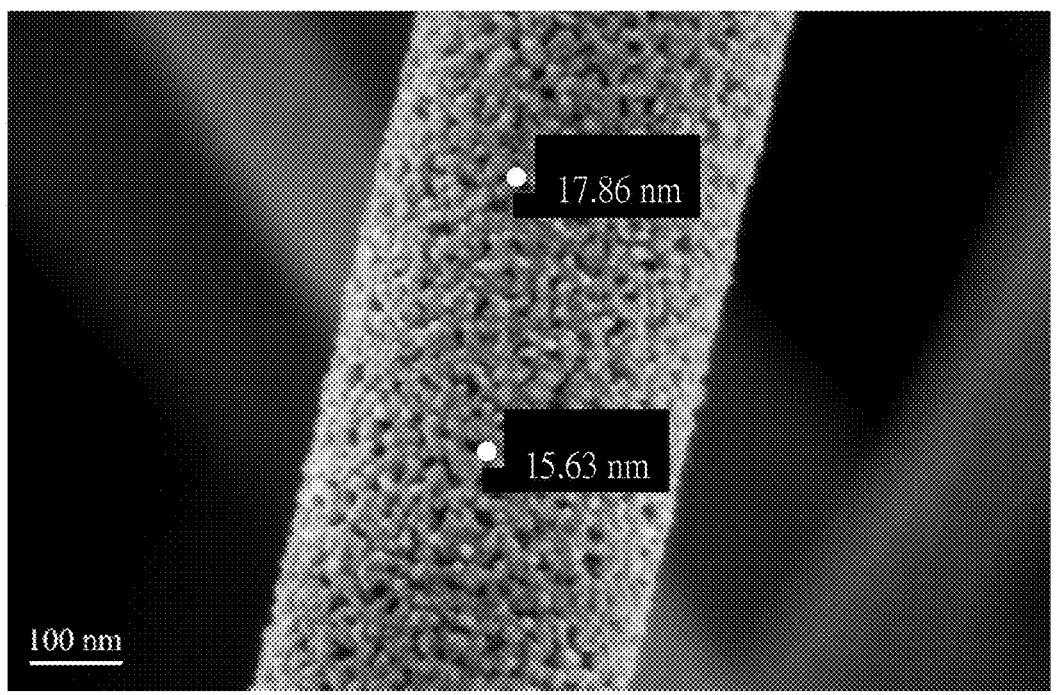
FIG. 2 is a scanning electron microscope image of the inorganic nanofiber made by Example 2 of this disclosure.

A scanning electron microscope (SEM) image of the inorganic nanofibers (E2) is shown in FIG. 2, in which the nanofibers have a diameter ranging from 200 nm to 400 nm, and the polycrystalline tin(IV) oxide particles have a particle size ranging from 15 nm to 25 nm.

Comparative Example 1a: Preparation of Inorganic Nanofibers (CE1a) Including Polycrystalline Titanium Dioxide Particles The manufacturing process for the Comparative Example 1a is similar to that of Example 1 except that the annealing temperature is 500° C.

The inorganic nanofibers (CE1a) have a diameter ranging from 100 nm to 400 nm, and the polycrystalline titanium dioxide particles have a particle size larger than 75 nm.

Comparative Example 1b: Preparation of Inorganic Nanofibers (CE1b) Including Polycrystalline Titanium Dioxide Particles The manufacturing process for the Comparative Example 1b is similar to that of Example 1 except that the electrospinnable solution is electrospun at the relative humidity of 74%

The inorganic nanofibers (CE1b) have a diameter ranging from 100 nm to 400 nm, and the polycrystalline titanium dioxide particles have a particle size larger than 75 nm.

Comparative Example 1c: Preparation of Inorganic Nanofibers (CE1c) Including Polycrystalline Titanium Dioxide Particles The manufacturing process for the Comparative Example 1c is similar to that of Example 1 except that the electrospinnable solution is electrospun at the relative humidity of 45%.

The inorganic nanofibers (CE1c) have a diameter ranging from 100 nm to 400 nm, and the polycrystalline titanium dioxide particles have a particle size larger than 75 nm.

Comparative Example 1d: Preparation of Inorganic Nanofibers (CE1d) Including Polycrystalline Titanium Dioxide Particles The manufacturing process for the Comparative Example 1d is similar to that of Example 1 except that the electrospinnable solution is electrospun at the relative humidity of 45% and that the annealing temperature is 600° C.

The inorganic nanofibers (CE1d) have a diameter ranging from 100 nm to 400 nm, and the polycrystalline titanium dioxide particles have a particle size larger than 75 nm.

Comparative Example 2a: Preparation of Inorganic Nanofibers (CE2a) Including Polycrystalline Tin(IV) Oxide Particles The manufacturing process for the Comparative Example 2a is similar to that of Example 2 except that the electrospinnable solution is electrospun at the relative humidity of 56% and the annealing temperature is 500° C.

The inorganic nanofibers (CE2a) have a diameter ranging from 100 nm to 400 nm, and the polycrystalline tin(IV) oxide particles have a particle size larger than 75 nm.

Comparative Example 2b: Preparation of Inorganic
Nanofibers (CE2b) Including Polycrystalline
Tin(IV) Oxide Particles The manufacturing process for the Comparative Example 2b is similar to that of Example 2 except that the relative humidity is 70%.

The inorganic nanofibers (CE2b) have a diameter ranging from 100 nm to 400 nm, and the polycrystalline tin(IV) oxide particles have a particle size larger than 75 nm.

Comparative Example 2c: Preparation of Inorganic
Nanofibers (CE2c) Including Polycrystalline
Tin(IV) Oxide Particles The manufacturing process for the Comparative Example 2c is similar to that of Example 2 except that the electrospinnable solution is electrospun at the relative humidity of 40%.

The inorganic nanofibers (CE2c) have a diameter ranging from 100 nm to 400 nm, and the polycrystalline tin(IV) oxide particles have a particle size larger than 75 nm.
Determination of Photoelectric Property The photoelectric property of the inorganic nanofibers (E1, E2, CE1a to CE1d, and CE2a to CE2c) is measured by a semiconductor device parameter analyzer (B1500A, commercially available from Agilent Technologies) with a probe connected to silver electrode. The inorganic nanofibers are subjected intermittently to pulsed light irradiation with different wavelengths of 365 nm, 465 nm, 595 nm, 730 nm, 850 nm and 940 nm. Each irradiation period is 100 seconds long, followed by a 100-second break before the next pulse. Results of the measurement are shown in FIGS. 3 and 4.

Figure 3:
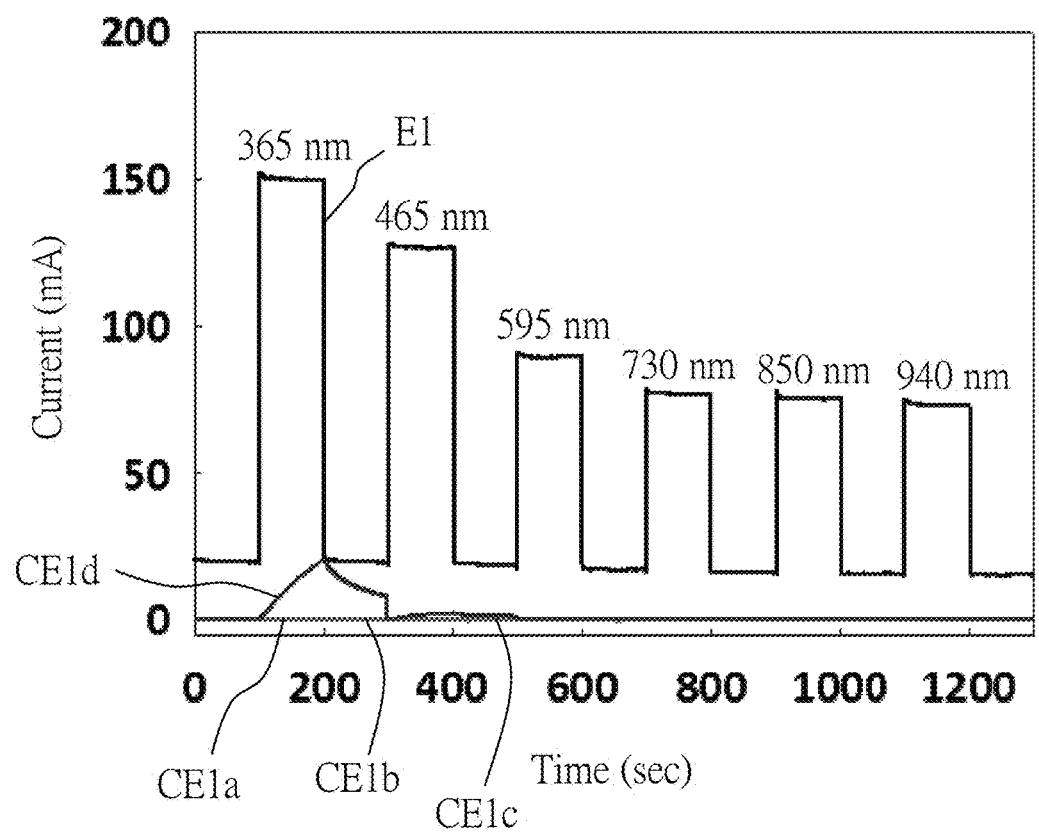
FIG. 3 is a diagram showing the photoelectric property of the inorganic nanofibers made by Example 1 of this disclosure and Comparative Examples 1a to 1d.
Figure 4:
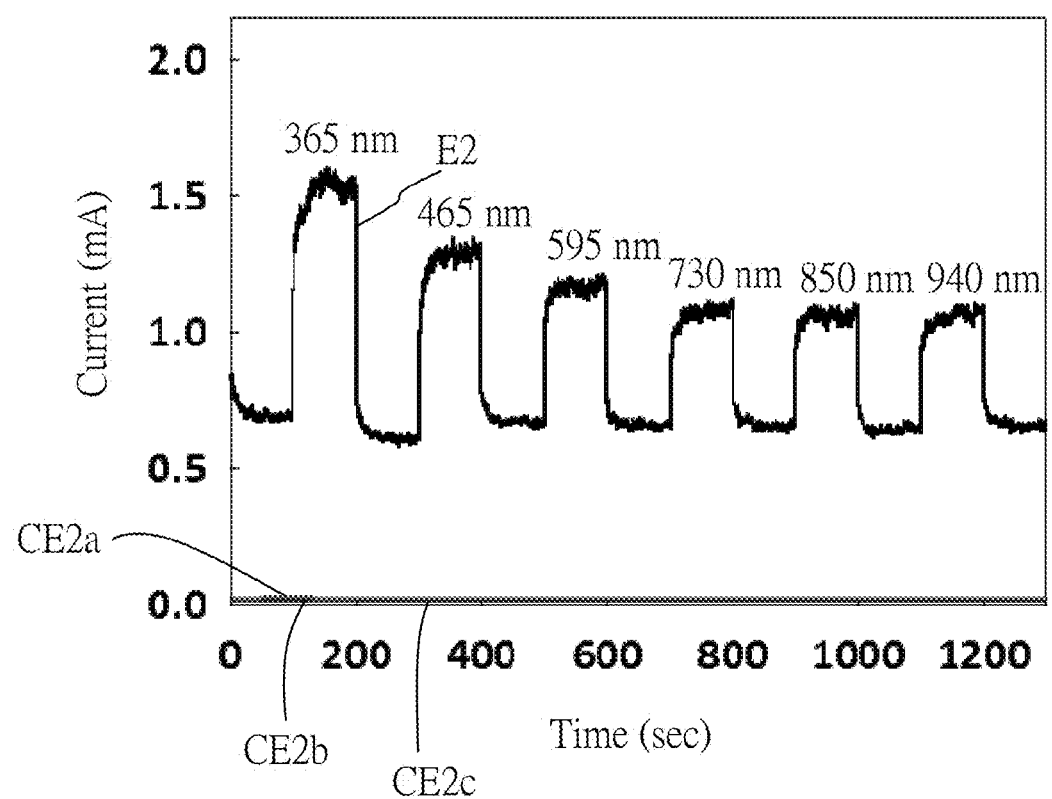
FIG. 4 is a diagram showing the photoelectric property of the inorganic nanofibers made by Example 2 of this disclosure and Comparative Examples 2a to 2c.

As shown in FIGS. 3 and 4, the inorganic nanofibers (E1, E2) of this disclosure can be excited by not only ultraviolet light (i.e., the light having a wavelength of 365 nm) but also visible and infrared lights (i.e., the lights having wavelengths of 465 nm, 595 nm, 730 nm, 850 nm and 940 nm) to generate electric current. On the other hand, only a part of the inorganic nanofibers (CE1a to CE1d, CE2a to CE2c) can be excited by ultraviolet light to generate electric current, and no electric current is measurable from the inorganic nanofibers (CE1a to CE1d, CE2a to CE2c) excited by visible and infrared lights. Therefore, it is shown that the inorganic nanofibers (E1, E2) are responsive to both visible and infrared lights. On the contrary, the inorganic nanofibers (CE1a to CE1d, CE2a to CE2c) are unresponsive to visible and infrared lights due to their lattice defects.

In the description above, for the purposes of explanation, numerous specific details have been set forth in order to provide a thorough understanding of the examples and embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is (are) considered the exemplary examples and embodiments, it is understood that this disclosure is not limited to the disclosed examples and embodiments but is intended to cover various arrangements included within the spirit and scope of the broadest interpretation so as to encompass all such modifications and equivalent arrangements.

What is claimed is:

1. A method for manufacturing inorganic nanofibers capable of generating an electric current upon exposure to visible or infrared light, comprising:
    adding polyvinylpyrrolidone into ethanol to obtain a polymer solution containing 9% of polyvinylpyrrolidone;
    mixing the polymer solution with acetic acid in a volume ratio of 7:2 and then adding titanium isopropoxide to obtain an electrospinnable solution containing titantium and having a molar concentration of 0.23M;
    electrospinning the electrospinnable solution at a relative humidity ranging from 50% to 60% to form a plurality of nanofibers; and
    annealing the nanofibers at a temperature ranging from 700° C. to 800° C. to obtain a plurality of polycrystalline titanium dioxide nanofibers, wherein the polycrystalline titanium dioxide nanofibers are capable of generating an electric current upon exposure to ultraviolet, visible or infrared light.

2. The method as claimed in claim 1, wherein the step of electrospinning is conducted at a voltage ranging from 18 kV to 20 kV.

3. The method as claimed in claim 1, wherein during the step of electro spinning, a tip-to-collector distance ranges from 13 cm to 15 cm.

4. The method as claimed in claim 1, wherein, prior to electro spinning, the electrospinnable solution is heated to a temperature ranging from 70° C. to 80° C. for 1 hour to 3 hours, followed by cooling the electrospinnable solution to room temperature for electro spinning.

5. The method as claimed in claim 1, wherein the polycrystalline titanium dioxide nanofibers include titanium dioxide particles having a particle size ranging from 15 nm to 75 nm.

6. The method as claimed in claim 1, wherein each of the polycrystalline titanium dioxide nanofibers has a cross-sectional width ranging from 100 nm to 400 nm.

* * * * *